United States Patent [19]
Lach et al.

[11] Patent Number: 5,908,471
[45] Date of Patent: Jun. 1, 1999

[54] DIAGNOSTIC ARRANGEMENT FOR DIGITAL COMPUTER SYSTEM

[75] Inventors: Jorge E. Lach, Lexington; George R. Plouffe, Jr., Bradford; Gerald L. Marchessault, Lawrence, all of Mass.

[73] Assignee: Sun Microsystems, Inc, Palo Alto, Calif.

[21] Appl. No.: 08/792,506

[22] Filed: Jan. 31, 1997

[51] Int. Cl.$^6$ .................................................. G01R 31/28
[52] U.S. Cl. ........................... 714/805; 714/712; 714/53; 714/25
[58] Field of Search ................................ 371/20.1, 37.01, 371/37.7, 48, 49.1, 49.2, 51.1, 67.1, 68.1, 68.2, 70; 395/182.02, 182.08, 182.21, 183.01, 183.07, 183.19, 185.01, 185.06; 364/230, 265.1, 266, 266.3, 944.61, 944.9, 945.6

[56] References Cited

U.S. PATENT DOCUMENTS

| | | | |
|---|---|---|---|
| 4,785,453 | 11/1988 | Chandran et al. | 395/183.01 |
| 5,155,735 | 10/1992 | Nash et al. | 371/49.1 |
| 5,537,425 | 7/1996 | Tsou | 371/51.1 |
| 5,649,090 | 7/1997 | Edwards et al. | 395/182.08 |
| 5,689,634 | 11/1997 | McBride | 395/183.15 |

Primary Examiner—Trinh L. Tu
Attorney, Agent, or Firm—Richard A. Jordan

[57] ABSTRACT

A diagnostic subsystem is used in a digital device in a digital computer system includes a diagnostic register, a device output control circuit and a diagnostic register reset circuit. The diagnostic register includes a plurality of stages each of which is associated with one of the types of transfers over the bus. Each stage is selectively conditionable by the digital computer system's processor. The device output control circuit controls transfers by the digital device over the bus. The device output control circuit enables the digital device, when it is to engage in a transfer, to transfer information correctly when the associated stage is set and to transfer information incorrectly when the stage has the set condition. For transfers in which the one device is to transmit information over the bus, the incorrectly transmitted information causes error checking circuitry in other devices in the system to generate error indications, which are provided to the processor. On the other hand, for transfers in which the device is to receive information over the bus, correctly received information causes error checking circuitry in the device to generate an error indication, which is also provided to the processor. The diagnostic register reset circuit enables said the respective stages to be conditioned to said reset condition following a transfer of incorrect information during a transfer of said associated transfer type, so that the one device engages in such a transfer once after being enabled by the processor.

30 Claims, 2 Drawing Sheets

DIAGNOSTIC ARRANGEMENT FOR DIGITAL COMPUTER SYSTEM

FIELD OF THE INVENTION

The invention relates generally to the field of digital computer systems, and more particularly to diagnostic arrangement for digital computer systems.

BACKGROUND OF THE INVENTION

Digital computer systems comprise a number of subsystems and devices which must generally work together properly in order to enable correct processing of data. Digital computer systems typically include error-checking circuitry to ensure that the component subsystems and devices are operating properly. However, it will be appreciated that, if the error checking circuitry itself is not operating properly, it will be unable to verify that the other components are operating properly, and, indeed, may indicate that correctly-operating components are not operating properly.

SUMMARY OF THE INVENTION

The invention provides a new and improved diagnostic arrangement for a digital computer system for testing circuitry in the digital computer system which is used to verify correct operation of the system during normal operation.

In brief summary, the invention provides a diagnostic subsystem for use in connection with one of a plurality of digital devices in a digital computer system. The digital computer system includes a plurality of digital devices interconnected by a bus which transfers information among the devices in a plurality of types of transfers. The diagnostic subsystem comprises a diagnostic register, a device output control circuit and a diagnostic register reset circuit. The diagnostic register includes a plurality of stages each of which is associated with one of the types of transfers over the bus. Each of the register is selectively conditionable by the digital computer system's processor to a set condition and a reset condition. The device output control circuit controls transfers of by the digital device over said bus. In that operation, the device output control circuit enables the digital device to, when said it is to engage in the associated type, transfer information correctly when the associated one stage is in the reset condition, and transfer information incorrectly when the stage has the set condition. For transfers in which the one device is to transmit information over the bus, the incorrectly transmitted information causes error checking circuitry in other devices in the system to generate error indications, which are provided to the processor. On the other hand, for transfers in which the one device is to receive information over the bus, the incorrectly received information causes error checking circuitry in the one device to generate an error indication which is also provided to the processor. The diagnostic register reset circuit enables said the respective stages to be conditioned to said reset condition following a transfer of incorrect information during a transfer of said associated transfer type, so that the one device engages in such a transfer once after being enabled by the processor.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
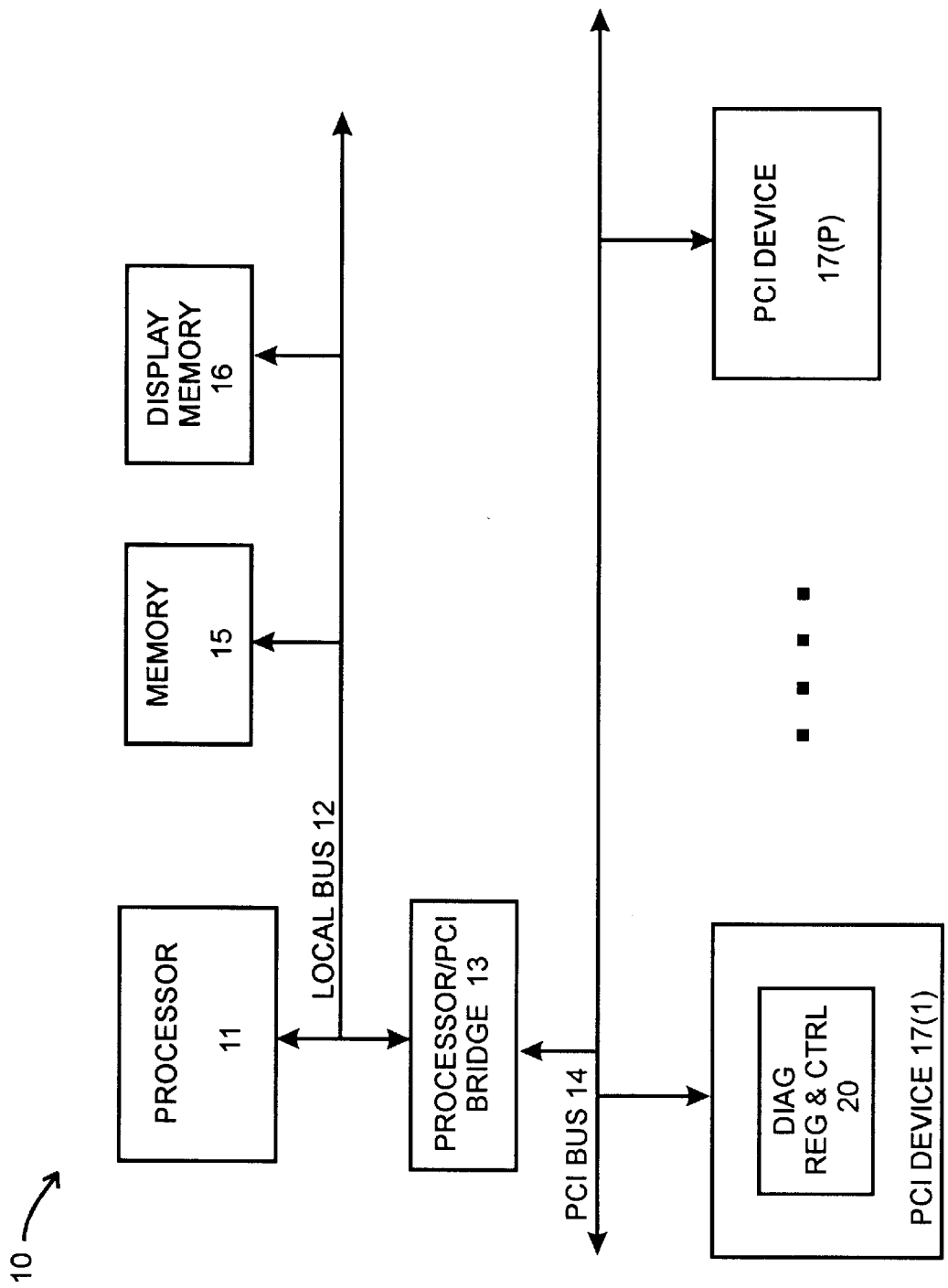
FIG. 1 is a functional block diagram of an illustrative digital computer system including a diagnostic arrangement constructed in accordance with the invention.

FIG. 1 is a functional block diagram of an illustrative digital computer system 10 including a diagnostic arrangement constructed in accordance with the invention. With reference to FIG. 1, digital computer system 10 includes a processor 11 which can communicate with one or more local devices over a local bus 12, and through a bridge 13 with one or more remote devices over a remote bus, which in one embodiment comprises PCI bus 14. Generally, local devices connected to the local bus 12 include, for example, a main memory 15 from which the processor 11 retrieves data and programs for processing, and in which the processor 11 can store processed data. In addition, the local devices may include a display memory 16 into which the processor 11 loads information to be displayed to an operator on, for example, a video display device (not separately shown). The processor 11 may also retrieve information stored in the display memory 16 to, for example, verify that the display memory 16 is properly storing the information provided thereto. The video display is provided to display output information generated by the processor 11 on a screen to the operator (not separately shown), including data that the operator may input for to be processed, information that the operator may input to control processing, as well as information generated during processing. The processor 11 generates information for display by the video display device using a so-called "graphical user interface" ("GUI"), in which information for various applications programs is displayed using various "windows." Although the computer system 10 is shown as including a particular component, namely, a video display, for displaying output information to the operator, it will be appreciated that the computer system 10 may include a variety of components in addition to or instead of the video display described herein.

The remote devices, identified herein as PCI devices 17(1) through 17(P) (generally identified by reference numeral 17(p)), connected to PCI bus 14 may include a number of other components in the digital computer system 10, including, for example, interfaces to operator input components, interfaces to hardcopy output devices such as printers, communication interfaces, mass storage devices, and the like. The mass storage subsystems may include such devices as disk or tape subsystems, optical disk storage devices and CD-ROM devices in which information may be stored and/or from which information may be retrieved. One or more of the mass storage subsystems may utilize removable storage media which may be removed and installed by an operator, which may allow the operator to load programs and data into the digital computer system 10 and obtain processed data therefrom. Under control of control information provided thereto by the processor, information stored in the mass storage subsystems may be transferred to the memory for storage. After the information is stored in the memory, the processor may retrieve it from the memory for processing. After the processed data is generated, the processor may also enable the mass storage subsystems to retrieve the processed data from the memory for relatively long-term storage.

The operator input element(s) are provided to permit an operator to input information for processing. In one embodiment, the operator input elements include such devices as a keyboard and/or a mouse which an operator can manipulate to provide information for processing by the digital computer system. Although the computer system 10 is described as including components, namely, a keyboard an/or mouse, which an operator can use to input information for processing, it will be appreciated that the computer system 10 may include a variety of components in addition to or instead of the keyboard and/or mouse described herein.

The communication interfaces typically include one or more network ports, which are connected to communication links which connect the computer system 10 in a computer network, and one or more communications ports, which connect the computer system 10 to other computer systems (not shown) over, for example, the public telephony system. The network ports enable the computer system 10 to transmit information to, and receive information from, other computer systems and other devices in the network. In a typical network organized according to, for example, the client-server paradigm, certain computer systems in the network are designated as servers, which store data and programs (generally, "information") for processing by the other, client computer systems, thereby to enable the client computer systems to conveniently share the information. A client computer system which needs access to information maintained by a particular server will enable the server to download the information to it over the network. After processing the data, the client computer system may also return the processed data to the server for storage. In addition to computer systems (including the above-described servers and clients), a network may also include, for example, printers and facsimile devices, digital audio or video storage and distribution devices, and the like, which may be shared among the various computer systems connected in the network. The communication links interconnecting the computer systems in the network 10 may, as is conventional, comprise any convenient information-carrying medium, including wires, optical fibers or other media for carrying signals among the computer systems. Computer systems transfer information over the network by means of messages transferred over the communication links, with each message including information and an identifier identifying the device to receive the message.

The communications ports also enable the computer system 10 to connect to another computer system or other device over a communications medium, which may also be a wire, optical fiber or other signal-carrying medium, or a communications system such as the public telephony system. A communications port may connect directly to a communications port of another computer system. Alternatively, a port may be connected to a modem (modulator/demodulator) which converts digital signals provided by the computer system 10 into audio signals for transmission over the public telephony system for transmission to another computer system, and further converts audio signals received from the public telephony system into digital signals to be provided to the computer system 10. Communications ports are used to facilitate transfer of files between the computer system 10 and another computer system (that is, the other computer system connected to the communications medium over which the computer system 10 is communicating). In addition, communications ports are used to enable the computer system 10 to operate as a terminal on the other computer system, that is, the computer system 10 effectively operates as the operator input and display devices for a program that is being executed on the other computer system. That is, while operating as a terminal, the computer system 10 effectively transfers the operator's inputs through the keyboard, mouse or other operator input element, to the other computer system through their respective communications ports, and the receiving computer system will recognize and use the information it receives through its communications port as an operator's input, just as it would operator input that it might receive through its own keyboard or mouse. Similarly, any operator output, such as a visual display output that it might generate for display on its own video display device, will be redirected through its communications port for transfer to the computer system 10, which will display the video output on its video display device. During a session involving communications through respective communications ports, that is, while two computer systems are transferring files through their communications ports or while one computer system is operating as a terminal on another computer system, the computer systems are effectively directly connected to each other and to no other computer system, and so they need only transfer information therebetween, without any necessity of transmitting identifiers or the like to identify the intended recipient of the information.

The invention provides an arrangement for providing maintenance and diagnostic services to the PCI devices 17(*p*), under control of a maintenance and diagnostic program processed by the processor 11. In accordance with the maintenance and diagnostic arrangement, at least one of the PCI devices, identified here as PCI device 17(1), is provided with a diagnostic register and control circuit 20, which is controllable by the processor 11 to force the PCI device 17(1) to initiate selected types of erroneous transfers over the PCI bus 14. Others of the PCI devices 17(*p*) (p≠1) receive the erroneous transfers and, if error-checking circuits (not shown) which they maintain are operating properly, they (that is, the other PCI devices) will signal an error over the PCI bus 14. The processor/PCI bridge 13, in turn, will receive the error signal and provide an error indication to the processor 11. The diagnostic register and control circuit 20 is constructed to force such an erroneous transfer over the PCI bus 14 for only one such transfer, after being enabled by the processor 11, thereby to ensure that the PCI device does not continually initiate erroneous transfers over the PCI bus 14.

In addition, the diagnostic register and control circuit 20 is controllable by the processor to force the PCI device 17(1) to receive selected types of correct transfers as being erroneous, thereby to enable the error-checking circuits which it (that is, PCI device 17(1)) includes to be tested to verify that they are operating properly. If the error checking circuits included in PCI device 17(1) are operating properly, if the diagnostic register and control circuit 20 is enabled to force PCI device 17(1) to recognize a correct transfer over the PCI bus 14 as being erroneous, it (that is, the PCI device 17(1)) will signal an error over the PCI bus 14. In such an operation, the diagnostic register and control circuit 20 enables the PCI device 17(1) to receive an otherwise proper transfer, and alter the transfer in such a way as to make it erroneous. The processor/PCI bridge 13 will receive the error signal generated by the PCI device 17(1) and provide an error indication to the processor 11. The diagnostic register and control circuit 20 is constructed to force such an error for only one such transfer, after being enabled by the processor 11, thereby to ensure that the PCI device does not continually determine that transfers over the PCI bus 14 are erroneous.

As noted above, the diagnostic register and control circuit 20 controls the PCI device 17(1) in connection with selected types of transfers over the PCI bus 14. In one embodiment, the diagnostic register and control circuit 20 enables the PCI device 17(1) to generate an erroneous transfer such that:

1. if the PCI device 17(1) is the master device during a transfer, in which case it provides an address identifying a particular one of the PCI devices 17(p) (p≠1) which is to participate in the transfer, the PCI device 17(1) will provide an address and an accompanying parity value over PCI bus 14 such that the parity value is incorrect, and,
2. if the PCI device 17(1) provides data during a transfer, either as a master device or as a slave device, the PCI device 17(1) will provide data and an accompanying parity value over PCI bus 14 such that the parity value is incorrect.

In connection with item (1) above, if the PCI device 17(1) provides an address and an accompanying parity value over PCI bus 14 such that the parity value is incorrect, address verification circuitry (not separately shown) in other PCI devices 17(p) (p≠1) will generate an error signal if it (that is, the address verification circuitry) is operating properly. After it is enabled by the processor 11, the diagnostic register and control circuit 20 will enable the PCI device 17(1) to provide such an erroneous address and accompanying parity value for one transfer, after which the PCI device 17(1) will, if it is operating properly, provide correct address and accompanying parity values for transfers for which it is the master device.

Similarly, in connection with item (2) above, if the PCI device 17(1) provides data and an accompanying parity value over PCI bus 14 such that the parity value is incorrect, data verification circuitry (not separately shown) in other PCI devices 17(p) (p≠1) will generate an error signal if it is operating properly. After it is enabled by the processor 11, the diagnostic register and control circuit 20 will enable the PCI device 17(1) to provide such an erroneous data and accompanying parity value for one transfer, after which the PCI device 17(1) will, if it is operating properly, provide correct data and accompanying parity values for transfers for which it provides data.

Circuitry in the diagnostic register and control circuit 20 for enabling the PCI device 17(1) to provide an address and accompanying parity value over PCI bus 14 such that the parity value is incorrect (item (1) above) will be described below in connection with FIG. 2. Circuitry in the diagnostic register and control circuit 20 for enabling the PCI device 17(1) to provide data and accompanying parity value over PCI bus 14 such that the parity value is incorrect (item (2) above) is not specifically shown in FIG. 2, but such circuitry is similar to the circuitry depicted in FIG. 2 for enabling the PCI device 17(1) to provide an address and accompanying parity value over PCI bus 14 such that the parity value is incorrect.

In addition, the diagnostic register and control circuit 20 enables the PCI device 17(1) to receive transfers which may otherwise be correct such that:

3. if another PCI device 17(p') (p'≠1) is the master device during a transfer, in which case the PCI device 17(p') provides an address identifying a particular one of the other PCI devices 17(p) (p'≠p) which is to receive the transfer, the PCI device 17(1) will receive the address and an accompanying parity value and modify them so that parity value is incorrect, and,
4. if another PCI device 17(p') (p'≠1) provides data during a transfer, either as a master device or as a slave device, the PCI device 17(1) will receive data and an accompanying parity value and modify them so that the parity value is incorrect.

In connection with (3) above, if the PCI device 17(1) receives the address and an accompanying parity value and modifies them so that the parity value is incorrect, address verification circuitry in the diagnostic register and control circuit 20 of PCI device 17(1) (which will be described below in connection with FIG. 2) will generate an error signal if it is operating properly. After it is enabled by the processor 11, the diagnostic register and control circuit 20 will enable the PCI device 17(1) to receive an address and accompanying parity value as being erroneous for one transfer, after which the PCI device 17(1) will, if it is operating properly, correctly receive address and accompanying parity values for transfers for which other PCI devices 17(p) (p≠1) are the master devices.

Similarly, in connection with (4) above, if the PCI device 17(1) receives data and an accompanying parity value and modifies them so that the parity value is incorrect, data verification circuitry (not separately shown) in the PCI device 17(1) will generate an error signal if it is operating properly. After it is enabled by the processor 11, the diagnostic register and control circuit 20 will enable the PCI device 17(1) to receive data and an accompanying parity value as being erroneous for one transfer, after which the PCI device 17(1) will, if it is operating properly, correctly receive data and accompanying parity values for transfers from other PCI devices 17(p) (p≠1).

Circuitry in the diagnostic register and control circuit 20 for enabling the PCI device 17(1) to receive an address and accompanying parity value over PCI bus 14 such that the parity value is incorrect (item (3) above) will be described below in connection with FIG. 2. Circuitry in the diagnostic register and control circuit 20 for enabling the PCI device 17(1) to receive data and accompanying parity value over PCI bus 14 such that the parity value is incorrect (item (2) above) is not specifically shown in FIG. 2, but such circuitry is similar to the circuitry depicted in FIG. 2 for enabling the PCI device 17(1) to receive an address and accompanying parity value over PCI bus 14 such that the parity value is incorrect.

Finally, the diagnostic register and control circuit 17(1) enables the PCI device 17(1) to generate disconnect and target abort indications, for transfer over the PCI bus 14, when operating as a slave device in connection with a transfer. Generally, the disconnect indication and target abort indication will enable the master device for a transfer to temporarily pause a transfer when the slave device will require more than a predetermined amount of time to complete the transfer. When the master device temporarily pauses such a transfer, other PCI devices 17(p) can engage in transfers over the PCI bus 14.

Figure 2:
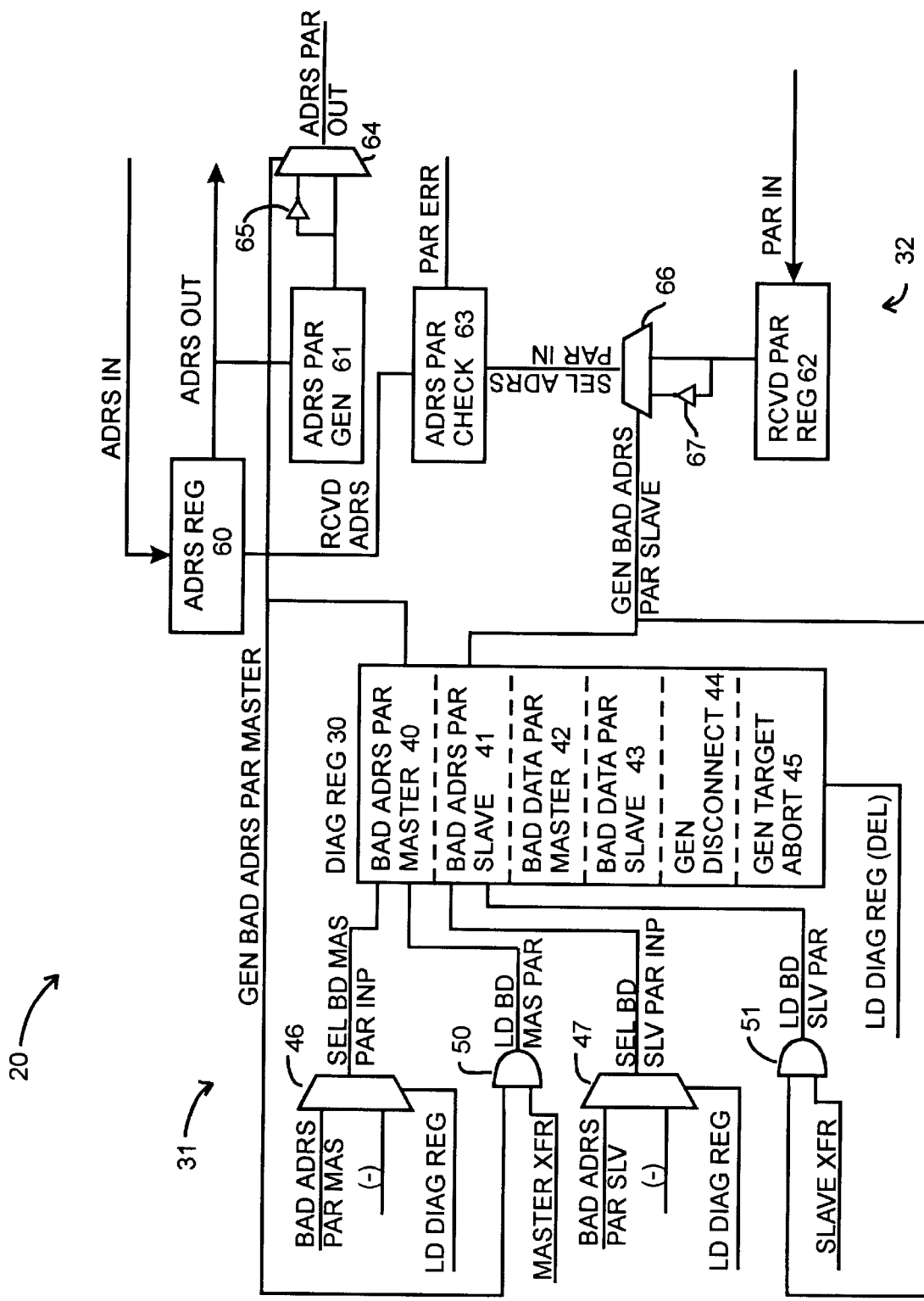
FIG. 2 is a functional block diagram of a diagnostic register and control circuit useful in the digital computer system depicted in FIG. 1.

FIG. 2 depicts a logic diagram of a diagnostic register and control circuit 20 used in PCI device 17(1). With reference to FIG. 2, the diagnostic register and control circuit 20 includes a diagnostic register 30, an input control circuit 31 and a master/slave output control circuit 32. The diagnostic register 30 can be loaded through the input control circuit 31 in response to transfers initiated by the processor 11 under control of a diagnostic program. The information loaded in the diagnostic register 30 enables the diagnostic register and control circuit 20 control the PCI device 17(1) to perform the operations described above in connection with items (1) through (6) above. In addition, after the diagnostic register 30 is loaded, when the diagnostic register and control circuit 20 enables the PCI device 17(1) to perform each of the respective operations, the input control circuit 31 conditions the diagnostic register 30 so that the PCI device 17(1) performs the respective operation once. If the respective operation is to be performed a subsequent time, the processor 11 enables the diagnostic register 30 to be reloaded so as to enable the operation to be performed again.

The master/slave output control circuit 32 receives signals from the diagnostic register, which are generated in response to the information loaded therein, and controls the generation of information to be transferred for operations described above in connection with items (1) and (2) above, the reception of information for operations described above in connection with items (3) and (4) above, and the generation of control signals for transfer over the PCI bus 14 in connection with items (5) and (6) above. Thus, for the operation described above in connection with item (1), that is, if the PCI device 17(1) is the master device during a transfer, the PCI device 17(1) is enabled to provide an address and an accompanying parity value over PCI bus 14 such that the parity value is incorrect, the master/slave output control circuit 32 enables the parity value generated for the address to be the complement of the correct parity value. Similarly, for the operation described above in connection with item (2), in which if the PCI device 17(1) provides data during a transfer, the PCI device 17(1) provides data and an accompanying data value over PCI bus 14 such that the parity value is incorrect, the master/slave output control circuit 32 enables the parity value generated for the address to be the complement of the correct parity value. The complementing of the parity value by master/slave output control circuit 32 will result in the parity being incorrect, and if the error checking circuitry in other PCI devices 17($p$) ($p \neq 1$) is operating properly, the other PCI devices 17($p$) will signal an error over PCI bus 14 as described above.

On the other hand, for the operation described above in connection with item (3), that is, if another PCI device 17($p'$) ($p' \neq 1$) is the master device during a transfer, the PCI device 17(1) will receive the address and an accompanying parity value and modify them so that parity value is incorrect, the master/slave output control circuit 32 enables a parity check operation to be performed in connection with the complement of the received parity value. If the parity value as received by the PCI device 17(1) was correct, which will be the case if the master PCI device 17($p'$) ($p' \neq 1$) and PCI bus 14 are operating properly, the complementing of the parity value by master/slave output control circuit 32 will result in the parity being incorrect, and if the error checking circuitry in the PCI device 17(1) is operating properly, the PCI device 17(1) will signal an error over PCI bus 14 as described above.

Similarly, for the operation described above in connection with item (4), that is, if another PCI device 17($p'$) ($p' \neq 1$) provides data during a transfer, the PCI device 17(1) receives data and an accompanying parity value and modifies them so that the parity value is incorrect, the master/slave output control circuit 32 enables a parity check operation to be performed in connection with the complement of the received parity value. If the parity value as received by the PCI device 17(1) was correct, which will be the case if the other PCI device 17($p'$) ($p' \neq 1$) and PCI bus 14 are operating properly, the complementing of the parity value by master/slave output control circuit 32 will result in the parity being incorrect, and if the error checking circuitry in the PCI device 17(1) is operating properly, the PCI device 17(1) will signal an error over PCI bus 14 as described above.

Finally, for the operations described above in connection with items (5) and (6), if the PCI device 17(1) is a slave device, the master/slave output control circuit enables the PCI device 17(1) to generate the respective disconnect or target abort indications for transfer over the PCI bus 14.

With reference to FIG. 2, the diagnostic register 30 includes a number of stages, including a bad address parity master stage 40, a bad address parity slave stage 41, a bad data parity master stage 42, a bad data parity slave stage 43, a generate disconnect stage 44 and a generate target abort stage 45, each of which is associated with and controls the operations described above in connection with items (1) through (6) above. In particular, (i) the bad address parity master stage 40 controls the operation described above in connection with item (1), (ii) the bad address parity slave stage 41 controls the operation described above in connection with item (3), (iii) the bad data parity master stage 42 controls the operation described above in connection with item (2), (iv) the bad data parity slave stage 43 controls the operation described above in connection with item (4), (v) the generate disconnect stage 44 controls the operation described above in connection with item (5), and (vi) the generate target abort stage 45 controls the operation described above in connection with item (6).

FIG. 2 specifically depicts circuitry for using the bad address parity master stage 40 and bad address parity slave stage 41 in performing the operations described above in connection with items (1) and (3) above in connection with addresses transmitted and received by the PCI device 17(1) during the respective operation. Similar circuitry will be provided for using the information in the bad data parity master stage 42 and bad data parity slave stage 43 in performing the operations described above in connection with items (2) and (4) above in connection with the data transmitted and received by the PCI device 17(1) during the respective operation. Finally, the information in the generate disconnect stage 44 and generate target abort stage 45 will be used directly to control the PCI bus interface circuitry (not separately shown) for the PCI device 17(1) in generating a disconnect and target abort signals in accordance with the PCI bus transfer methodology when the PCI device 17(1) is a slave device.

The input control circuit 31 controls the loading of the respective stages 40 through 45 of the diagnostic register 30. The input control circuit 31 includes a number of input selectors, two of which, identified by reference numerals 46 and 47 are shown in FIG. 2. Each of the input selectors selectively couples input information for loading in a respective one of the stages 40 through 45. Thus, as shown in FIG. 2, input selector 46 selectively couples input information for loading in bad address parity master stage 40, and input selector 47 selectively couples input information for loading in the bad address parity slave stage 41. When the diagnostic register 30 is loaded in response to a transfer from the processor 11, a LD_DIAG_REG load diagnostic register signal enables the selectors to couple respective BAD_ADRS_PAR_MAS bad address parity master, BAD_ADR_PAR_SLV bad address parity slave, and similar signals, representing information transferred by the processor 11, to the respective stages 40 through 45 as respective SEL_BD_MAS_PAR_INP selected bad master parity input, SEL_BD_SLV_PAR_INP selected bad slave parity input, and similar signals. A LD_DIAG_REG_DEL delayed load diagnostic register signal then enables all of the stages 40 through 45 of the register to store the signals provided by the respective input selectors in unison. The LD_DIAG_REG_DEL delayed load diagnostic register signal is delayed from the LD_DIAG_REG load diagnostic register signal by an amount which allows the SEL_BD_MAS_PAR_INP selected bad master parity input, SEL_

BD_SLV_PAR_INP selected bad slave parity input, and similar signals provided by respective selectors 46, 47, etc., to propagate and settle at the inputs of the respective stages 40 through 45 of the diagnostic register 30.

The input control circuit 31 further controls the selective conditioning of the respective stages 40 through 45 to provide that the PCI device 17(1) performs the respective operations described in connection with items (1) through (6) above, once, when enabled by information loaded into the diagnostic register 30 received from the processor 11. When the LD_DIAG_REG load diagnostic register signal is not asserted, the respective selectors couple respective negated signals (represented by "(−)" in FIG. 2) to the inputs of the respective stages 40 through 45. Each of the stages 40 through 45 is also provided with a stage load control circuit, including a respective AND gate. Two such AND gates, identified by reference numerals 50 and 51, are shown in FIG. 2, associated with the respective stages 40 and 45. AND gate 50 is associated with and controls the loading of bad address parity master stage 40 after the PCI device 17(1) performs the operation described above in connection with item (1) above, and AND gate 51 is associated with and controls the loading of bad address parity slave stage 41 after the PCI device 17(1) performs the operation described above in connection with item (3) above.

AND gate 50 is controlled to assert a LD_BD_MAS_PAR load bad master parity signal, which enables the stage 40 to load the SEL_BD_MAS_PAR_INP selected bad master parity input signal from selector 40, when both a GEN_BAD_ADRS_PAR_MASTER generate bad address parity master signal and a MASTER_XFR master transfer signal are asserted. When the GEN_BAD_ADRS_PAR_MASTER signal is asserted, the diagnostic register and control circuit 20 enables the PCI device 17(1) to provide an address and an accompanying parity value over PCI bus 14 such that the parity value is incorrect when it is a master device (that is, the operation described above in connection with item (1)). Thus, when both the GEN_BAD_ADRS_PAR_MASTER generate bad address parity master signal and the MASTER_XFR signal are asserted, the PCI device 17(1) will have completed the operation described above in connection with item (1). When the LD_BD_MAS_PAR load bad master parity signal is asserted, the LD_DIAG_REG load diagnostic register signal is also negated, in which case the selector 46 will be providing the negated signal input thereto to the stage 40 as the SEL_BD_MAS_PAR_INP selected bad master parity input signal, in which case the assertion of the LD_BD_MAS_PAR signal will enable the bad address parity master stage 40 to be cleared.

Similarly, AND gate 51 is controlled to assert a LD_BD_SLV_PAR load bad slave parity signal, which enables the stage 41 to load the SEL_BD_SLV_PAR_INP selected bad slave parity input signal from selector 41, when both a GEN_BAD_ADRS_PAR_SLAVE generate bad address parity slave signal and a SLAVE_XFR slave transfer signal are asserted. When the GEN_BAD_ADRS_PAR_SLAVE signal is asserted, the diagnostic register and control circuit 20 enables the PCI device 17(1) to receive an address and an accompanying parity value over PCI bus 14 and determine the parity value is incorrect when it is a slave device (that is, the operation described above in connection with item (3)). Thus, when both the GEN_BAD_ADRS_PAR_SLAVE generate bad address parity slave signal and the SLAVE_XFR signal are asserted, the PCI device 17(1) will have completed the operation described above in connection with item (3). When the LD_BD_SLV_PAR load bad slave parity signal is asserted, the LD_DIAG_REG load diagnostic register signal is also negated, in which case the selector 47 will be providing the negated signal input thereto to the stage 41 as the SEL_BD_SLV_PAR_INP selected bad slave parity input signal, in which case the assertion of the LD_BD_SLV_PAR signal will enable the bad address parity slave stage 41 to be cleared.

Each of the other stages 42 through 45 of the diagnostic register 30 is provided with an AND gate (not shown) which is controlled to enable the respective stage 42 through 45 to latch the signal provided thereto in a manner similar to that described above in connection with AND gates 50 and 51.

The master/slave output control circuit 32 includes a number of elements for using the respective stages 40 through 45 of the diagnostic register 30 to perform the operations described above in connection with items (1) through (4). Circuitry for performing the operations described above in connection with items (1) and (3), in connection with addresses transmitted and received by the PCI device 17(1), is depicted in FIG. 2; it will be appreciated that similar circuitry will be provided for performing operations described above in connection with items (2) and (4), in connection with data transmitted and received by the PCI device 17(1), will also be provided. As shown in FIG. 2, the master/slave output control circuit 32 includes an address register 60, an address parity generator 61, a received parity register 62, an address parity check circuit 63, and a plurality of parity selectors each comprising a multiplexer 64, 66 and associated inverter 65, 67. When the PCI device 17(1) is a master device, an address will be loaded into the address register 60, which address will be provided as an ADRS_OUT address out signal to the PCI device's bus interface (not separately shown) for transmission over the PCI bus 14. On the other hand, when another PCI device 17(*p*) (p≠1) is a slave device, the bus interface will receive an address from the PCI bus 14 and provide it as an ADRS_IN address in signal for storage in the address register 60.

The address parity generator 61 receives the ADRS_OUT address out signal from the address register 60 and generates a parity value. If the GEN_BAD_ADRS_PAR_MASTER generate bad address parity master signal from the bad address parity master stage 40 is negated, which will be the case when the PCI device 17(1) is not enabled to provide an incorrect parity value in connection with the address (that is, it is not performing the operation described above in connection with item (1)), the multiplexer 64 is enabled to provide the parity value generated by the address parity generator 61 as an ADRS_PAR_OUT address parity out signal to the bus interface for transmission with the ADRS_OUT signal.

On the other hand, if the GEN_BAD_ADRS_PAR_MASTER generate bad address parity master signal from the bad address parity master stage 40 is asserted, which will be the case when the PCI device 17(1) is enabled to provide an incorrect parity value in connection with the address (that is, it is performing the operation described above in connection with item (1)), the multiplexer 64 is enabled to provide the complement of the parity value generated by the address parity generator 61, provided by the inverter 65, as an ADRS_PAR_OUT address parity out signal to the bus interface for transmission with the ADRS_OUT signal. In that case, the parity value will be the complement of the correct parity value, as generated by the address parity generator 61, thereby to enable the PCI device 17(1) to provide an incorrect parity value.

The address parity check circuit 63 receives a RCVD_ADRS received address signal from the address register 60 representing the address received by the bus interface when the PCI device 17(1) is not the master device. The address parity check circuit 63 also receives a SEL_ADRS_PAR_IN selected address parity in signal from the multiplexer 66. If the GEN_BAD_ADRS_PAR_SLAVE generate bad address parity slave signal from the bad address parity slave stage 41 is negated, which will be the case when the PCI device 17(1) is not enabled to provide an incorrect parity value in connection with the address (that is, it is not performing the operation described above in connection with item (3)), the multiplexer 66 is enabled to provide the parity value from the received parity register 62, which, in turn, corresponds to a PAR IN parity in signal representing the parity value associated with the address in the address register 60 as received by the bus interface. In that case, if the parity value in the received parity register 62 is correct, the address parity check circuit 63 will negate a PAR ERR parity error signal, thereby to indicate that the parity value received for the address was correct. On the other hand, if the parity value in the received parity register 62 is incorrect, the address parity check circuit 63 will assert a PAR ERR parity error signal, thereby to indicate that the parity value received for the address was incorrect.

On the other hand, if the GEN_BAD_ADRS_PAR_SLAVE generate bad address parity slave signal from the bad address parity slave stage 41 is asserted, which will be the case when the PCI device 17(1) is enabled to provide an incorrect parity value in connection with the address (that is, it is performing the operation described above in connection with item (3)), the multiplexer 66 is enabled to provide the complement of the parity value in the received parity register 62, provided by the inverter 67, as an ADRS_PAR_OUT address parity out signal to the bus interface for transmission with the ADRS_OUT signal. In that case, if the parity value in the received parity register 62 is correct, the address parity check circuit 63 will assert the PAR ERR parity error signal, thereby to indicate that the parity value received for the address was incorrect. On the other hand, if the parity value in the received parity register 62 is incorrect, the address parity check circuit 63 will negate a PAR ERR parity error signal, which will serve to indicate that the parity value received for the address was correct.

It will be appreciated that circuitry (not shown) similar to that described above will also be provided associated with stages 42 and 43 of the diagnostic register 30, for use in connection with operations described above in connection with items (2) and (4).

In operation, the processor 11, under control of an appropriate diagnostic and maintenance program, enables the diagnostic register and control circuit 20 to, in turn, enable PCI device 17(1) to perform the operation described above in connection with item (1), that is, while PCI device 17(1) is the master device during a transfer, it (that is, the PCI device 17(1)) provides an address and an accompanying parity value over PCI bus 14 such that the parity value is incorrect, by enabling a set value to be loaded into bad address parity master stage 40 of the diagnostic register 30. To accomplish that, the processor 11 will initiate a transfer over local bus 12 including an address which identifies the diagnostic register 30, accompanied by an appropriate data value. The processor/PCI bridge 13, in turn, couples the transfer from the local bus 12 onto the PCI bus 14. PCI bus interface circuitry in the PCI device 17(1) (not shown) receives the transfer from the PCI bus 14, and provides the data value as the BAD_ADRS_PAR_MAS bad address parity master, BAD_ADR_PAR_SLV bad address parity slave, etc., signals to respective inputs of selectors 46, 47, etc. In addition, the PCI bus interface circuitry generates the LD_DIAG_REG load diagnostic register signal so as to enable the selectors 46, 47, etc., to couple the BAD_ADRS_PAR_MAS bad address parity master, BAD_ADR_PAR_SLV bad address parity slave, etc., signals to the stages 40 through 45 of diagnostic register 30 as the SEL_BD_MAS_PAR_INP selected bad master parity input, SEL_BD_SLV_PAR_INP selected bad slave parity input, etc., signals, and the LD_DIAG_REG_DEL load diagnostic register delayed signal to enable the stages 40 through 45 of the diagnostic register to load the signals at their respective inputs. It will be appreciated that, when processor 11 is to enable the PCI device 17(1) to perform the operation described above in connection with item (1), it can provide, as the appropriate data value, a data value which causes the PCI device's PCI bus interface to, in turn, provide an asserted BAD_ADRS_PAR_MAS bad address parity master signal, and negate the other signals, thereby to set the bad address parity master stage 40 and reset the other stages 41 through 45. Thereafter, the PCI bus interface circuitry will negate the LD_DIAG_REG load diagnostic register and LD_DIAG_REG_DEL load diagnostic register delayed signals.

When the bad address parity master stage 40 has been set, it will assert the GEN_BAD_ADRS_PAR_MASTER signal. In this condition, when the PCI device 17(1) next becomes the master device in connection with a transfer over the PCI bus 14, the master/slave output control circuit 32 provides the address to be used, stored in address register 60, as ADRS_OUT address out signals to the PCI bus interface circuitry (not separately shown). In addition, the ADRS_OUT address out signals are provided to the address parity generator 61, which generates a signal corresponding to the appropriate parity value which is coupled to one input of the multiplexer 64. The invertor 65 also receives the parity value signal and provides a signal corresponding to the complemented parity value to the other input of multiplexer 64, which, it will be appreciated, is the erroneous parity value for the address represented by the ADRS_OUT signal. The asserted GEN_BAD_ADRS_PAR_MASTER generate bad address parity master signal provided by the stage 40 enables the multiplexer 64 to couple the signal generated by the invertor 65 as the ADRS_PAR_OUT address parity out signal to the PCI bus interface circuitry. The PCI bus interface circuitry receives both the ADRS_OUT address out signals from the address register 60, and the ADRS_PAR_OUT signal from the multiplexer 64, representing the erroneous parity value, for transmission over the PCI bus 14.

After the PCI device 17(1) has performed the transfer as the master device over PCI bus 14, the PCI bus interface circuitry will assert the MASTER_XFR master transfer signal. Since the GEN_BAD_ADRS_PAR_MASTER signal is also asserted, the AND gate 50 will be energized, thereby to assert the LD_BD_MAS_PAR load bad master parity signal, which, in turn, enables the bad address parity master stage 40 to load the SEL_BD_MAS_PAR_INP selected bad master parity input signal. At this point, the PCI bus interface circuitry is negating the LD_DIAG_REG load diagnostic register signal, which enables the selector 46 to couple the negated input as the SEL_BD_MAS_PAR_INP selected bad master parity input signal. Thus, when the LD_BD_MAS_PAR load bad master parity signal is asserted, the bad address parity master stage 40 will be reset. The reset stage 40 negates the GEN_BAD_ADRS_PAR_MASTER generate bad address parity master signal, which, in turn, enables the multiplexer 64 to couple the parity signal generated by the address parity generator 61 as the ADRS_ PAR_OUT address parity out signal for subsequent transfers for which the PCI device 17(1) is the PCI bus master device. It will be appreciated that, if the address parity generator 61 is operating properly, the parity signal generated by the address parity generator 61 will represent the correct parity value for the ADRS_OUT address out signal provided by address register 60. Accordingly, the PCI device 17(1) will perform the operation described in connection with item (1) for only one transfer.

In addition, it will be appreciated that the negated GEN_BAD_ADRS_PAR_MASTER signal will maintain the AND gate 50 in a de-energized condition regardless of the condition of the MASTER_XFR master transfer signal. Thus, the bad address parity master stage 40 will only be reloaded in connection with a transfer from the processor 11 as described above.

Similarly, the processor 11, under control of an appropriate diagnostic and maintenance program, enables the diagnostic register and control circuit 20 to, in turn, enable PCI device 17(1) to perform the operation described above in connection with item (3), that is, while another PCI device 17(p') (p'≠1) is the master device during a transfer, the PCI device 17(1) will receive the address provided by the master device and an accompanying parity value and modify them so that parity value is incorrect, by enabling a set value to be loaded into bad address parity slave stage 41 of the diagnostic register 30. To accomplish that, the processor 11 will initiate a transfer over local bus 12 including an address which identifies the diagnostic register 30, accompanied by an appropriate data value. The processor/PCI bridge 13, in turn, couples the transfer from the local bus 12 onto the PCI bus 14. PCI bus interface circuitry in the PCI device 17(1) (not shown) receives the transfer from the PCI bus 14, and provides the data value as the BAD_ADRS_PAR_MAS bad address parity master, BAD_ADR_PAR_SLV bad address parity slave, etc., signals to respective inputs of selectors 46, 47, etc. In addition, the PCI bus interface circuitry generates the LD_DIAG_REG load diagnostic register signal so as to enable the selectors 46, 47, etc., to couple the BAD_ADRS_PAR_MAS bad address parity master, BAD_ADR_PAR_SLV bad address parity slave, etc., signals to the stages 40 through 45 of diagnostic register 30 as the SEL_BD_MAS_PAR_INP selected bad master parity input, SEL_BD_SLV_PAR_INP selected bad slave parity input, etc., signals, and the LD_DIAG_REG_DEL load diagnostic register delayed signal to enable the stages 40 through 45 of the diagnostic register to load the signals at their respective inputs. It will be appreciated that, when processor 11 is to enable the PCI device 17(1) to perform the operation described above in connection with item (1), it can provide, as the appropriate data value, a data value which causes the PCI device's PCI bus interface to, in turn, provide an asserted BAD_ADRS_PAR_SLV bad address parity slave signal, and negate the other signals, thereby to set the bad address parity slave stage 41 and reset the other stages 40 and 42 through 45. Thereafter, the PCI bus interface circuitry will negate the LD_DIAG_REG load diagnostic register and LD_DIAG_REG_DEL load diagnostic register delayed signals.

When the bad address parity slave stage 41 has been set, it will assert the GEN_BAD_ADRS_PAR_SLAVE signal. In this condition, when the PCI device 17(1) next receives an address from a master device in connection with a transfer over the PCI bus 14, the master/slave output control circuit 32 receives the address as ADRS_IN address in signals from the PCI bus interface circuitry and stores it in address register 60. The received address stored in address register 60 is coupled as the RCVD_ADRS received address signal to the address parity check circuit 63.

In addition, the master/slave output control circuit 32 receives the address parity value as a PAR_IN parity in signal from the PCI bus interface circuitry and stores it in a received parity register 62. A signal representing the parity value stored in register 62, and a second signal representing the complement of the parity value, as generated by inverter 67, are coupled to respective inputs of multiplexer 66. If the parity value as stored in register 62 is the correct parity value for the received address as stored in address register 60, it will be appreciated that the complemented parity value will be incorrect. With the GEN_BAD_ADRS_PAR_SLAVE signal asserted, the multiplexer 66 couples the signal representing the complement of the parity value as stored in register 62 as the SEL_ADRS_PAR_IN selected address parity in signal to the address parity check circuit 63.

The address parity check circuit 63, in turn, generates a parity value for the RCVD_ADRS received address signal and compares the generated parity value to the parity value represented by the SEL_ADRS_PAR_IN selected address parity in signal, and asserts the PAR_ERR parity error signal if the parity values differ. If the parity value in the received parity register 62 is the correct parity value for the received address as stored in the address register 60, which will be the case if the PCI device 17(p) (p≠1) operating as the master device, the PCI bus 14, and the master/slave output control circuit 32 are operating properly, since the SEL_ADRS_PAR_IN signal at this point represents the complement of the parity value stored in the received parity register 62, the address parity check circuit 63 will determine that the parity value which it generates for the RCVD_ADRS received address signal will differ from the parity value represented by the SEL_ADRS_PAR_IN signal, and assert the PAR_ERR parity error signal. On the other hand, if the address parity check circuit 63 determines that the parity value which it generates for the RCVD_ADRS received address signal does not differ from the parity value represented by the SEL_ADRS_PAR_IN signal, which can occur if the PCI device 17(p) (p≠1) operating as the master device, the PCI bus 14, or the master/slave output control circuit 32 are not operating properly, it (that is, the address parity check circuit 63) will not assert the PAR_ERR parity error signal.

After the PCI device 17(1) has performed these operations, the PCI bus interface circuitry will assert the SLAVE_XFR slave transfer signal. Since the GEN_BAD_ADRS_PAR_SLAVE signal is also asserted, the AND gate 51 will be energized, thereby to assert the LD_BD_SLV_PAR load bad slave parity signal, which, in turn, enables the bad address parity slave stage 41 to load the SEL_BD_SLV_PAR_INP selected bad slave parity input signal. At this point, the PCI bus interface circuitry is negating the LD_DIAG_REG load diagnostic register signal, which enables the selector 47 to couple the negated input as the SEL_BD_SLV_PAR_INP selected bad slave parity input signal. Thus, when the LD_BD_SLV_PAR load bad slave parity signal is asserted, the bad address parity slave stage 41 will be reset. The reset stage 41 negates the GEN_BAD_ADRS_PAR_SLAVE generate bad address parity slave signal, which, in turn, enables the multiplexer 66 to couple the parity signal stored by the received parity register 62 as the SEL_ADRS_PAR_IN selected address parity in signal for subsequent transfers for which the PCI device 17(1) is not the PCI bus master device. It will be appreciated that, if the address parity check circuit 63 is operating properly, if the parity value in the received parity register 62 is the correct parity value for the received address as stored in the address register 60, which will be the case if the PCI device 17(*p*) (p≠1) operating as the master device, the PCI bus 14, and the master/slave output control circuit 32 are operating properly, since the SEL_ADRS_PAR_IN signal at this point represents the parity value stored in the received parity register 62, the address parity check circuit 63 will determine that the parity value which it generates for the RCVD_ADRS received address signal will correspond to the parity value represented by the SEL_ADRS_PAR_IN signal, and negate the PAR_ERR parity error signal. On the other hand, if the address parity check circuit 63 determines that the parity value which it generates for the RCVD_ADRS received address signal does differs from the parity value represented by the SEL_ADRS_PAR_IN signal, which can occur if the PCI device 17(*p*) (p≠1) operating as the master device, the PCI bus 14, or the master/slave output control circuit 32 are not operating properly, it (that is, the address parity check circuit 63) will assert the PAR_ERR parity error signal.

In addition, it will be appreciated that the negated GEN_BAD_ADRS_PAR_MASTER signal will maintain the AND gate 50 in a de-energized condition regardless of the condition of the MASTER_XFR master transfer signal. Thus, the bad address parity master stage 40 will only be reloaded in connection with a transfer from the processor 11 as described above.

The invention provides a number of benefits. In particular, the invention provides an arrangement for facilitating program control of error checking circuitry in the PCI devices 17(*p*), including both the PCI device 17(1) which includes the diagnostic register and control circuit 20 and other PCI devices 17(*p*) (p≠1) which do not include a diagnostic register and control circuit 20. In particular, it allows the PCI device 17(1) to, as a master device, controllably generate an address with an erroneous parity value, thereby to enable the address checking circuitry in the other PCI devices 17(*p*) (p≠1) to be tested. In addition, it allows the PCI device 17(1) to, as a slave device, controllably determine that an address correctly received from a master device is accompanied by an incorrect parity value, thereby to enable the address checking circuitry in the PCI device 17(1) to be tested.

Similarly, the invention allows the PCI device 17(1) to controllably generate data with an erroneous parity value, thereby to enable the data checking circuitry in the other PCI devices 17(*p*) (p≠1) to be tested. In addition, it allows the PCI device 17(1) to controllably determine that data correctly received from a master device is accompanied by an incorrect parity value, thereby to enable the data checking circuitry in the PCI device 17(1) to be tested.

Further, the invention allows the PCI device 17(1) to controllably generate disconnect and target abort indications during a transfer in which the PCI device 17(1) is a slave device, thereby to enable the proper operation of the master device during a transfer.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A diagnostic subsystem for use in connection with a selected one of a plurality of digital devices in a digital computer system, the digital devices being interconnected by a bus adapted to transfer information thereamong in a plurality of types of transfers, said diagnostic subsystem comprising:

A. a diagnostic register including at least one stage associated with a selected one of said plurality of types of transfers, said at least one stage being selectively conditionable to a set condition and a reset condition;

B. a device output control circuit adapted to control transfers of said selected transfer type by said one digital device over said bus, said device output control circuit controlling said one digital device to, when said one digital device is to engage in a said selected transfer type, transfer information correctly when the at least one stage has said reset condition, and transfer information incorrectly when the at least one stage has said set condition; and C. a diagnostic register reset circuit adapted to enable said at least one stage to be conditioned to said reset condition following a said transfer by said one digital device of incorrect information during a transfer of said selected transfer type.

2. A diagnostic subsystem as defined in claim 1 in which one type of transfer is a master transfer, in which the one digital device transmits information in the form of an address and an accompanying parity value, the device output control circuit enabling the one digital device to correctly transfer the address and a correct parity value when said at least one stage has said reset condition, and to transmit the address and an incorrect parity value when said at least one stage has said set condition.

3. A diagnostic subsystem as defined in claim 2 in which said device output control circuit includes:

A. an address store adapted to store said address, the address store providing the address for transmission during the master transfer;

B. an address parity generator adapted to generate a parity value in response to the address stored in said address store;

C. an invertor adapted to generate a complementary parity value representing the complement of the parity value generated by said address parity generator; and D. a transmitted parity value selector adapted to select one of the parity value or the complementary parity value for transmission with the address provided by the address store during the master transfer, the transmitted parity value selector providing the parity value if said at least one stage has said reset condition, and said complementary parity value if said at least one stage has said set condition.

4. A diagnostic subsystem as defined in claim 2 in which said diagnostic register reset circuit resets said at least one stage following said master transfer.

5. A diagnostic subsystem as defined in claim 4 in which said diagnostic register reset circuit includes:
  A. a reset value generator adapted to generate a reset value for coupling to said at least one stage; and
  B. a stage load enable circuit, responsive to said at least one stage having said set condition and a transfer by said one digital device of the master type, adapted to generate a load enable signal to enable said at least one stage to load said reset value, thereby to reset said at least one stage.

6. A diagnostic subsystem as defined in claim 1 in which one type of transfer is a master transfer, in which another said digital device transmits information in the form of an address and an accompanying parity value, the device output control circuit enabling the one digital device to correctly receive the address and a correct parity value when said at least one stage has said reset condition, and to receive the address and an incorrect parity value when said at least one stage has said set condition.

7. A diagnostic subsystem as defined in claim 6 in which said device output control circuit includes:
  A. an address store adapted to store said address received during the master transfer;
  B. an address parity store adapted to store said received parity value received during the master transfer;
  C. an invertor adapted to generate a complementary received parity value representing the complement of the parity value stored in said address parity store; and
  D. a received parity value selector adapted to select one of the received parity value or the complementary received parity value, the received parity value selector providing the received parity value if said at least one stage has said reset condition, and said complementary received parity value if said at least one stage has said set condition; and
  E. an address parity check circuit adapted to generate an error indication in response to a correspondence between a parity check value generated in response to the address stored in said address store and the selected received parity value as selected by said received parity value selector.

8. A diagnostic subsystem as defined in claim 6 in which said diagnostic register reset circuit resets said at least one stage following said master transfer.

9. A diagnostic subsystem as defined in claim 8 in which said diagnostic register reset circuit includes:
  A. a reset value generator adapted to generate a reset value for coupling to said at least one stage; and
  B. a stage load enable circuit, responsive to said at least one stage having said set condition and a transfer by said one digital device of the master type, adapted to generate a load enable signal to enable said at least one stage to load said reset value, thereby to reset said at least one stage.

10. A diagnostic subsystem as defined in claim 1 in which one type of transfer is a data transmission transfer, in which the one digital device transmits information in the form of data and an accompanying parity value, the device output control circuit enabling the one digital device to correctly transfer the data and a correct parity value when said at least one stage has said reset condition, and to transmit the data and an incorrect parity value when said at least one stage has said set condition.

11. A diagnostic subsystem as defined in claim 10 in which said device output control circuit includes:
  A. a data store adapted to store said data, the data store providing the data for transmission during the data transmission transfer;
  B. a data parity generator adapted to generate a parity value in response to the data stored in said data store;
  C. an invertor adapted to generate a complementary parity value representing the complement of the parity value generated by said data parity generator; and
  D. a transmitted parity value selector adapted to select one of the parity value or the complementary parity value for transmission with the data provided by the data store during the data transmission transfer, the transmitted parity value selector providing the parity value if said at least one stage has said reset condition, and said complementary parity value if said at least one stage has said set condition.

12. A diagnostic subsystem as defined in claim 10 in which said diagnostic register reset circuit resets said at least one stage following said data transmission transfer.

13. A diagnostic subsystem as defined in claim 12 in which said diagnostic register reset circuit includes:
  A. a reset value generator adapted to generate a reset value for coupling to said at least one stage; and
  B. a stage load enable circuit, responsive to said at least one stage having said set condition and a transfer by said one digital device of the data transmission type, adapted to generate a load enable signal to enable said at least one stage to load said reset value, thereby to reset said at least one stage.

14. A diagnostic subsystem as defined in claim 1 in which one type of transfer is a data reception transfer, in which another said digital device transmits information in the form of data and an accompanying parity value, the device output control circuit enabling the one digital device to correctly receive the data and a correct parity value when said at least one stage has said reset condition, and to receive the data and an incorrect parity value when said at least one stage has said set condition.

15. A diagnostic subsystem as defined in claim 14 in which said device output control circuit includes:
  A. a data store adapted to store said data received during the data reception transfer;
  B. a data parity store adapted to store said received parity value received during the data reception transfer;
  C. an invertor adapted to generate a complementary received parity value representing the complement of the parity value stored in said data parity store; and
  D. a received parity value selector adapted to select one of the received parity value or the complementary received parity value, the received parity value selector providing the received parity value if said at least one stage has said reset condition, and said complementary received parity value if said at least one stage has said set condition; and
  E. a data parity check circuit for generating an error indication in response to a correspondence between a parity check value generated in response to the data stored in said data store and the selected received parity value as selected by said received parity value selector.

16. A diagnostic subsystem as defined in claim 15 in which said diagnostic register reset circuit resets said at least one stage following said data reception transfer.

17. A diagnostic subsystem as defined in claim 16 in which said diagnostic register reset circuit includes:

A. a reset value generator adapted to generate a reset value for coupling to said at least one stage; and B. a stage load enable circuit, responsive to said at least one stage having said set condition and a transfer by said one digital device of the data reception type, adapted to generate a load enable signal to enable said at least one stage to load said reset value, thereby to reset said at least one stage.

18. A diagnostic method for use in connection with a selected one of a plurality of digital devices in a digital computer system, the digital devices being interconnected by a bus adapted to transfer information thereamong in a plurality of types of transfers, said diagnostic subsystem comprising:

A. selectively conditioning a diagnostic register including at least one stage associated with a selected one of said plurality of types of transfers, said at least one stage being selectively conditionable to a set condition and a reset condition;

B. controlling said one digital device to, when said one digital device is to engage in a said selected transfer type, transfer information correctly when the at least one stage has said reset condition, and transfer information incorrectly when the at least one stage has said set condition; and C. enabling said at least one stage to be conditioned to said reset condition following a said transfer by said one digital device of incorrect information during a transfer of said selected transfer type.

19. A diagnostic method as defined in claim 18 in which one type of transfer is a master transfer, in which the one digital device transmits information in the form of an address and an accompanying parity value, the information transfer controlling step including the step of enabling the one digital device to correctly transfer the address and a correct parity value when said at least one stage has said reset condition, and to transmit the address and an incorrect parity value when said at least one stage has said set condition.

20. A diagnostic method as defined in claim 19 in which said information transfer controlling step includes the steps of:

A. generating said address for transmission during the master transfer;

B. generating an address parity value in response to the generated address;

C. generating a complementary parity value representing the complement of the parity value generated during said address parity generating step; and D. selecting one of the parity value or the complementary parity value for transmission with the address provided by the address store during the master transfer, the address parity value being selected if said at least one stage has said reset condition, and said complementary parity value being selected if said at least one stage has said set condition.

21. A diagnostic method as defined in claim 20 in which said diagnostic register reset step includes the steps of:

A. generating a reset value for coupling to said at least one stage; and

B. in response to said at least one stage having said set condition and a transfer by said one digital device of the master type, generating a load enable signal to enable said at least one stage to load said reset value, thereby to reset said at least one stage.

22. A diagnostic method as defined in claim 18 in which one type of transfer is a master transfer, in which another said digital device transmits information in the form of an address and an accompanying parity value, the information transfer controlling step including the step of correctly receiving the address and a correct parity value when said at least one stage has said reset condition, and receiving the address and an incorrect parity value when said at least one stage has said set condition.

23. A diagnostic method as defined in claim 22 in which said information transfer controlling step includes the steps of:

A. storing said address received during the master transfer;

B. storing said received parity value received during the master transfer;

C. generating a complementary received parity value representing the complement of the stored parity value; and D. selecting one of the received parity value or the complementary received parity value, the received parity value being selected if said at least one stage has said reset condition, and said complementary received parity value being selected if said at least one stage has said set condition; and E. generating an error indication in response to a correspondence between a parity check value generated in response to the address stored in said address store and the selected received parity value as selected by said received parity value selector.

24. A diagnostic method as defined in claim 23 in which said diagnostic register reset step includes the steps of:

A. generating a reset value for coupling to said at least one stage; and

B. responsive to said at least one stage having said set condition and a transfer by said one digital device of the master type, generating a load enable signal to enable said at least one stage to load said reset value, thereby to reset said at least one stage.

25. A diagnostic method as defined in claim 18 in which one type of transfer is a data transmission transfer, in which the one digital device transmits information in the form of data and an accompanying parity value, the information transfer controlling step including the step of enabling the one digital device to correctly transfer the data and a correct parity value when said at least one stage has said reset condition, and to transmit the data and an incorrect parity value when said at least one stage has said set condition.

26. A diagnostic method as defined in claim 25 in which said information transfer controlling step includes:

A. generating said data for transmission during the data transmission transfer;

B. generating a parity value in response to the data stored in said data store;

C. generating a complementary parity value representing the complement of the parity value generated by said data parity generator; and D. selecting one of the parity value or the complementary parity value for transmission with the data provided by the data store during the data transmission transfer, the parity value being selected if said at least one stage has said reset condition, and said complementary parity value being selected if said at least one stage has said set condition.

27. A diagnostic method as defined in claim 26 in which said diagnostic register reset step includes the steps of:

A. generating a reset value for coupling to said at least one stage; and

B. responsive to said at least one stage having said set condition and a transfer by said one digital device of the data transmission type, generating a load enable signal to enable said at least one stage to load said reset value, thereby to reset said at least one stage.

28. A diagnostic method as defined in claim 18 in which one type of transfer is a data reception transfer, in which another said digital device transmits information in the form of data and an accompanying parity value, the information transfer controlling step including the step of enabling the one digital device to correctly receive the data and a correct parity value when said at least one stage has said reset condition, and to receive the data and an incorrect parity value when said at least one stage has said set condition.

29. A diagnostic method as defined in claim 28 in which said information transfer controlling step includes the steps of:

A. storing said data received during the data reception transfer;

B. storing said received parity value received during the data reception transfer;

C. generating a complementary received parity value representing the complement of the parity value stored in said data parity store;

D. selecting one of the received parity value or the complementary received, the received parity value selector providing the received parity value if said at least one stage has said reset condition, and said complementary received parity value if said at least one stage has said set condition; and E. generating an error indication in response to a correspondence between a parity check value generated in response to the data stored in said data store and the selected received parity value.

30. A diagnostic method as defined in claim 29 in which said diagnostic register reset step includes the steps of:

A. generating a reset value for coupling to said at least one stage; and

B. responsive to said at least one stage having said set condition and a transfer by said one digital device of the data reception type, generating a load enable signal to enable said at least one stage to load said reset value, thereby to reset said at least one stage.

* * * * *